United States Patent [19]

Whiteley

[11] 4,395,809
[45] Aug. 2, 1983

[54] MANUFACTURE OF VIBRATION DAMPERS
[75] Inventor: John L. Whiteley, Sutton Coldfield, England
[73] Assignee: Concentric Pumps Ltd., West Midlands, England
[21] Appl. No.: 226,194
[22] Filed: Jan. 19, 1981
[30] Foreign Application Priority Data
  Jan. 25, 1980 [GB] United Kingdom ............... 8002666
[51] Int. Cl.³ .............................................. B23P 11/02
[52] U.S. Cl. ..................................... 29/451; 74/574; 188/378
[58] Field of Search .................... 29/450, 451, 235; 188/378, 379; 74/574

[56] References Cited
U.S. PATENT DOCUMENTS
  2,468,311  4/1949  Grotenhuis .................... 29/450 UX

*Primary Examiner*—Charlie T. Moon
*Attorney, Agent, or Firm*—C. O. Marshall, Jr.

[57] ABSTRACT

A vibration damper comprises a rigid inner member having a plain cylindrical outer surface, a rigid outer member having a plain cylindrical inner surface located in generally concentric relation with the cylindrical outer surface of the inner member, and an intermediate moulded ring of elastomeric material inserted between said cylindrical surfaces so as to be radially compressed therebetween. The elastomeric ring has outer and inner generally cylindrical surfaces contacting the inner and outer plain cylindrical surfaces of the outer and inner members respectively. At least one of the said inner and outer surfaces of the elastomeric ring is formed with a moulded textured finish with peaks and troughs such that the differential between the peaks and troughs in the textured surface is in the range of 250 to 1000 micro inches.

3 Claims, 2 Drawing Figures

MANUFACTURE OF VIBRATION DAMPERS

DESCRIPTION

This invention relates to a method of manufacturing a vibration damper of the kind comprising spaced apart inner and outer rings coupled together by an intermediate ring of elastomeric material, such as rubber. The inner and outer rings are in general of metal. The inner ring is usually in the form of a hub by means of which the damper can be mounted on a rotary shaft or other member to provide torsional damping.

In the manufacture of such dampers, the elastomeric ring is inserted by displacing it axially between the inner and outer rings in the manner of an interference fit and substantial forces have to be employed in carrying out this step. In the past, this step in the manufacturing process has been a relatively major contributory factor to the overall rejection rate because quite frequently the assembled elastomeric ring causes excessive run-out and lack of concentricity between the inner and outer rings and, in some cases, the elastomeric ring becomes jammed and cannot be properly assembled without damaging one or another of the components.

The present invention is based on the realisation that the difficulties in assembling the elastomeric ring to the inner and outer rings stem from the fact that the inner and outer peripheries of the elastomeric ring (i.e. those surfaces which contact the inner and outer rings) have always had a moulded smooth finish wherein the differential between the peaks and troughs in the surface is less than about 20 to 30 microinches.

According to the present invention we provide a method of manufacturing a vibration damper of the kind referred to wherein the elastomeric ring is produced as a moulding and is subsequently inserted between the inner and outer rings, characterised in that the elastomeric ring is moulded in such a way that at least one of its peripheral surfaces has a textured finish.

As used herein, the term "textured finish" applies to a surface in which the differential between peaks and troughs in the surface is substantially greater than for a smooth finish. Thus, compared with a differential of up to about 30 microinches for a smooth finish, the textured finish applied to elastomeric rings used in the method of the invention will be typically in the range of 250 to 1000 microinches, preferably 400 to 600 microinches.

The textured finish presently emloyed is in the form of a series of closely spaced circumferential V-section ribs extending around a or each peripheral surface of the elastomeric ring. However, satisfactory results are possible with various other surface configurations such as square section ribs, dimples etc. It is considered preferable that any surface configuration adopted should be such that the protuberances on the surface have some freedom to deflect about their roots in the axial direction, i.e. the direction of insertion of the elastomeric ring between the inner and outer rings.

Although improved results are attainable using an elastomeric ring having only one surface textured it is advantageous for both peripheral surfaces to be textured and in such a way that the coefficients of friction between each peripheral surface and the corresponding surface of the inner and outer rings with which they make contact are substantially the same. Thus, typically the texturing applied to both peripheral surfaces will be of the same nature.

Because the elastomeric ring is moulded with said textured peripheral surface or surfaces the same degree of texturing can be achieved for all of the rings produced.

By moulding the peripheral surfaces of the elastomeric ring with a textured finish, it has been found that insertion of the elastomeric ring into concentric relation with the inner and outer rings is made easier and the rejection rate due to jamming or excessive run-out/concentricity is lowered substantially. It is thought that the textured finish reduces the tendency of the peripheral surfaces of the rubber ring to stick at the adjacent peripheral surfaces of the inner and outer rings which causes the rubber to be placed in shear as it is displaced axially between the inner and outer rings. Thus, with a smooth surface finish after the rubber ring has been inserted, the rubber tends to relax with consequent run-out/lack of concentricity. With a textured finish, the degree of surface contact between the rubber ring and the inner and outer rings is reduced because contact is primarily at the protuberances on the textured surfaces and such protuberances are able to relieve more readily when stressed by the axial displacement. In this instance, any relaxation that the rubber undergoes tends to be less extensive with reduced run-out/lack of concentricity problems.

One example of the invention is illustrated in the accompanying drawings, in which.

Figure 1:
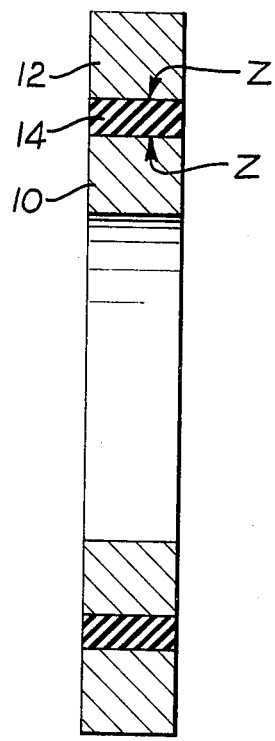
FIG. 1 is a diagrammatic diametral cross-section of a vibration damper.
Figure 2:
FIG. 2 is a fragmentary enlarged axial section showing the peripheral surface contour of the elastomeric ring of the damper shown in FIG. 1.

Referring now to the drawings, the damper comprises an inner ring 10, an outer ring 12 and an intermediate elastomeric ring 14 having inner and outer peripheral surfaces Z. These surfaces Z have a textured finish as previously described and in the illustrated embodiment, they comprise a series of generally circumferentially extending V-section ribs whose peak to crest height is typically in the range of 400 to 600 microinches.

I claim:

1. A method of manufacturing a vibration damper comprising the steps of producing a rigid inner member having a plain cylindrical outer surface, a rigid outer member having a plain cylindrical inner surface of a diameter greater than the diameter of the outer surface of said inner member, and an intermediate ring of elastomeric material having concentric inner and outer surfaces to fit said cylindrical surfaces of said inner and outer members, wherein the improvement comprises the steps of moulding said ring in such form that at least one of its inner and outer surfaces has ribs extending circumferentially of said ring with peaks and troughs such that the differential between the peaks and troughs is in the range of 250 to 1000 microinches, and then pressing said ring axially between said inner and outer members.

2. A method as claimed in claim 1 in which said differential lies in the range of 400 to 600 microinches.

3. A method as claimed in claim 1 characterised in that said ribs are of V-section.

* * * * *